United States Patent [19]

Snow

[11] Patent Number: 4,649,746

[45] Date of Patent: Mar. 17, 1987

[54] LIQUID LEVEL INDICATOR

[76] Inventor: A. Ray Snow, 2331 Alta Canyon, Sandy, Utah 84092

[21] Appl. No.: 723,556

[22] Filed: Apr. 15, 1985

[51] Int. Cl.⁴ .............................................. G01F 23/00
[52] U.S. Cl. ................. 73/290 R; 73/864.63; 116/227
[58] Field of Search ............... 116/227; 33/126.4 R, 33/126.4 A, 126.7 R, 126.7 A; 73/290 R, 290 B, 303, 864.63–864.67, 864.16, 864.17

[56] References Cited

U.S. PATENT DOCUMENTS

| 1,526,376 | 2/1925 | Rosenmund | 73/290 R |
| 2,539,604 | 1/1951 | Woolley | 73/290 R |
| 3,311,984 | 4/1967 | Stux et al. | 33/126.7 R |

FOREIGN PATENT DOCUMENTS

| 832457 | 9/1938 | France | 73/290 R |
| 1189271 | 10/1959 | France | 73/290 R |
| 526238 | 5/1955 | Italy | 33/126.4 R |
| 1155877 | 6/1969 | United Kingdom | 73/290 R |

*Primary Examiner*—Charles Frankfort
*Assistant Examiner*—W. Morris Worth
*Attorney, Agent, or Firm*—Trask, Britt & Rossa

[57] ABSTRACT

A liquid level indicator for use in monitoring the level of fluid in a reservoir remote from the user is disclosed. The indicator includes a receiving tube adapted to receive a quantity of fluid having an elevation reflective of the oil in the reservoir. The fluid is then confined by a reciprocating closure tube. A piston member is then depressed into the confined oil pressurizing that oil until an equilibrium position is obtained. The piston head is held in a constant spaced relationship with an indication element which is remote from the fluid reservoir. The amount of displacement of the piston head within the receiving tube is reflected by reference indicia carried by the indication element to indicate the level of fluid within the reservoir.

14 Claims, 22 Drawing Figures

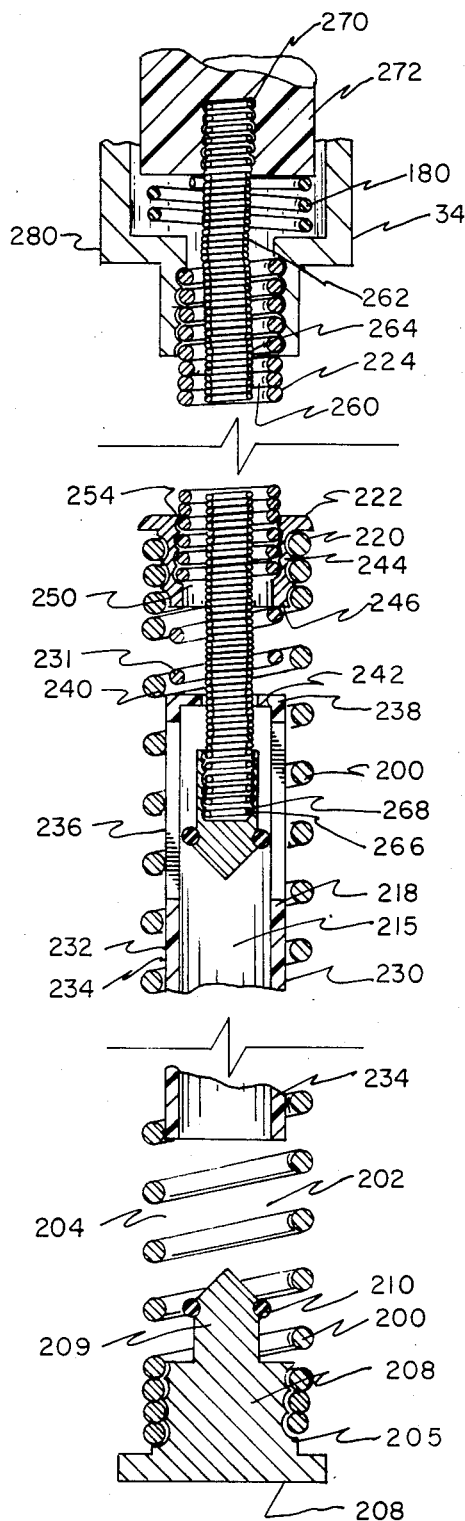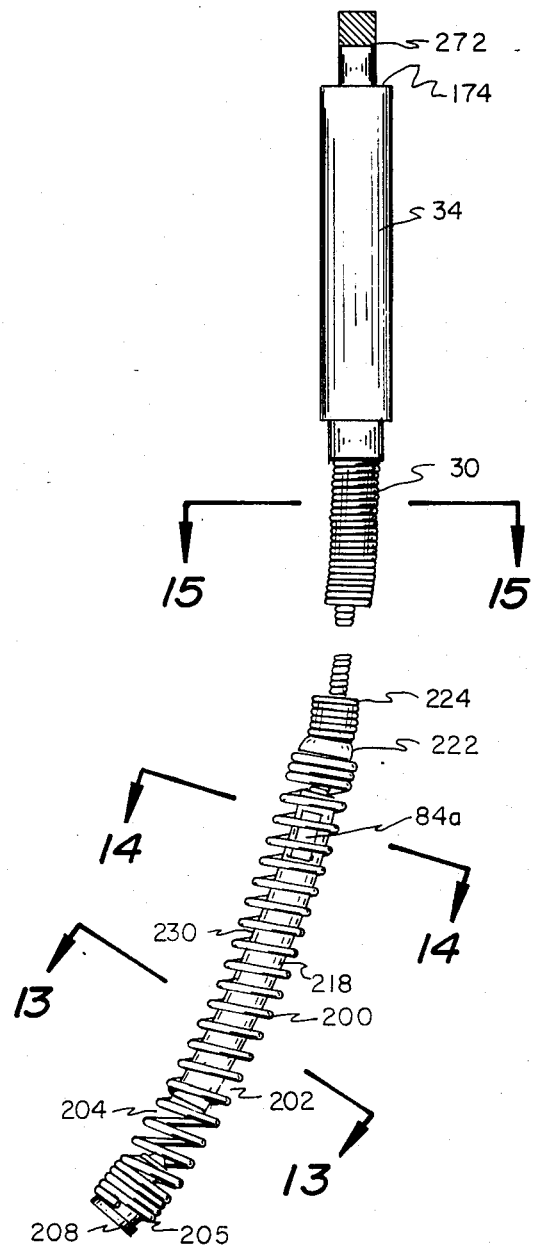
Fig. 12
Fig. 11

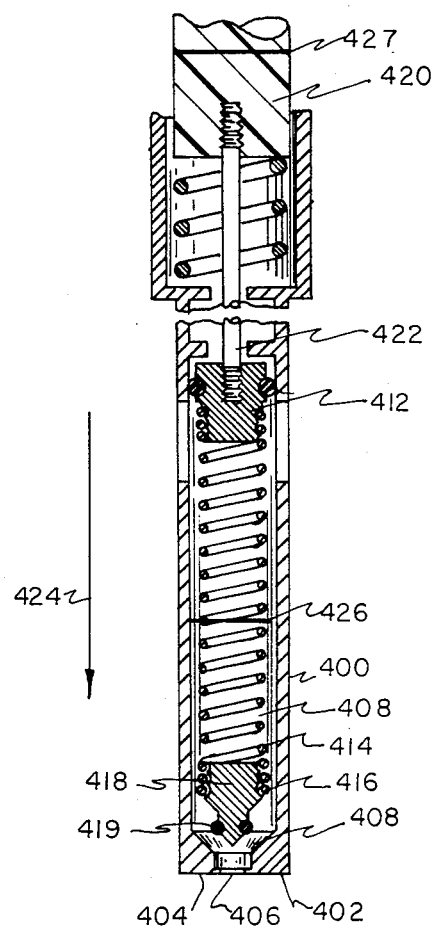
Fig. 19
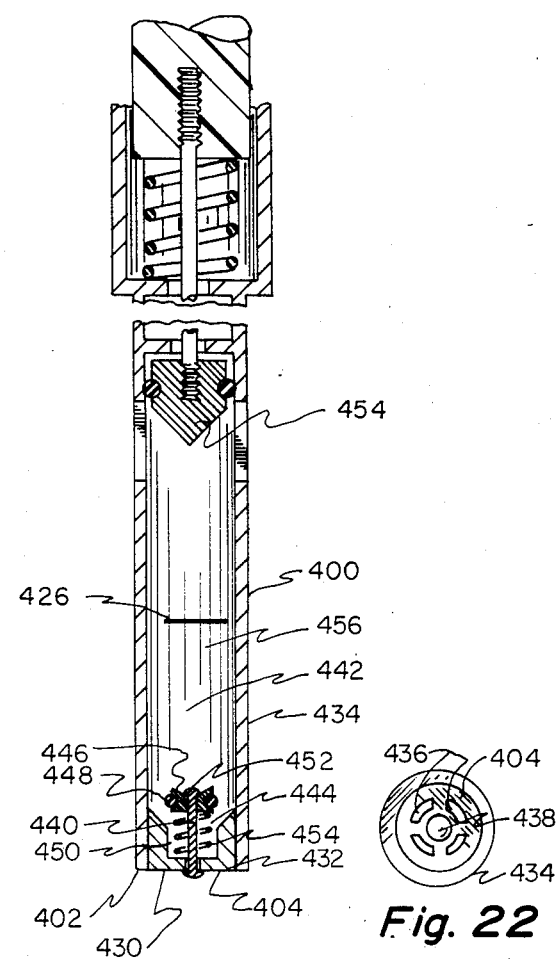
Fig. 21
Fig. 22
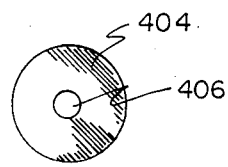
Fig. 20

LIQUID LEVEL INDICATOR

BACKGROUND OF THE INVENTION

1. Field:

This invention is related generally to liquid level monitoring apparatus. More particularly, the invention is directed to a monitoring means for use in verifying the level of oil or other liquid in a crankcase or other reservoir, which crankcase or reservoir is located remote from the access openings.

2. State of the Art:

In conventional practice, an internal combustion engine includes a crankcase or oil supply reservoir whose contents are monitored by means of a bladed dipstick assembly. This dipstick assembly generally includes an open-ended, continuous, tubular conduit which extends from an easily accessed location remote from the crankcase or oil supply reservoir, which typically is located in the lower regions of the engine assembly. Inserted within the conduit is a thin elongated blade which is dimensioned to slide through the conduit and thereby access the oil reservoir. The end portion of the dipstick which extends into the reservoir contains a series of etched markings which function as reference points.

To verify the oil reservoir level, the dipstick blade is inserted into the conduit such that an abutment member positioned proximate the blade's proximal end is brought into contact with the accessible end of the conduit so as to preclude further insertion of the blade into the conduit. In this fully inserted position, the distal end of the blade is positioned at a predetermined depth within the oil reservoir; i.e., the etched markings on the blade are positioned at a predetermined depth. The dipstick is dimensioned such that in its fully inserted position within the conduit, the distal, etched end of the blade is immersed in the oil extant within the reservoir.

The depth of the blade's penetration into the oil is a matter of design choice. To measure the oil level, the blade of the dipstick, being coated with oil, is removed from its conduit housing. The uppermost level of the coating of oil on the blade is then referenced against the etched markings on the blade. Since the blade was inserted to a predetermined depth within the reservoir, the relationship of the oil-coated level on the blade with the etched markings permits the oil level to be determined without actual visual inspection of that oil level.

As may be noted, the conventional monitoring practice utilizing a dipstick has serious drawbacks. Owing to the motion of the vehicle, the oil within the crankcase or reservoir is in constant motion. The dipstick is typically retained in its fully inserted position within the conduit during normal operation of the automobile. The motion of the oil tends to cause the oil to splash the dipstick, thereby leaving an oil coating on it which is not reflective of the true level of oil in the oil reservoir. Because of the viscosity of oil, this splashed oil coating will remain for a sufficient time that any monitoring of the oil level soon after driving of the automobile may be misleading. This phenomena is generaly addressed by a motorist by removing the dipstick prior to taking the reading and cleaning any oil residue from the blade tip. The blade is then reinserted and then removed again in order to obtain a valid reading. This process involves a considerable risk that the motorist will be soiled by the oil residue on the blade during the process.

The oil to be monitored, if recently changed, is substantially clear. The absense of color hinders attempts to compare the oil level against the markings on the dipstick blade. Reading a dipstick coated with clean oil at night or under conditions of poor lighting is difficult.

Typically, the conventional monitoring practice is time-consuming and subjects a motorist to the likelihood of being soiled by contact with various portions of the engine or, alternately, the oil removed from the reservoir by the dipstick. This inconvenience discourages many motorists from regularly checking the engine oil level of their vehicles. Such failure often leads to expensive and extensive engine damage.

Prior efforts in the art have attempted to simplify the monitoring process. The problems caused by removing the dipstick from its housing was addressed in U.S. Pat. No. 2,660,058 to Vogt. Vogt discloses a conduit-housed indicator which operates to lift a representative sample of oil to a position which permits a visual examination of the sample in relationship with a series of reference indicia. The indicator is never entirely removed from its conduit housing.

Various devices have been described which utilize induced pneumatic pressure variances to effect a displacement of an indicator fluid within a manometer or other differential pressure indicator. Representative of these devices are those proposed in U.S. Pat. No. 3,834,236 to Durin; U.S. Pat. No. 1,792,754 to Myers; U.S. Pat. No. 3,972,234 to Osojnak; U.S. Pat. No. 4,235,186 to Frobose; U.S. Pat. No. 1,241,384 to Hueber; U.S. Pat. No. 1,368,187 to Murphy; U.S. Pat. No. 3,935,835 to Rinck; and U.S. Pat. No. 4,055,898 to Bruan, et al.

SUMMARY OF THE INVENTION

A liquid level monitor constructed according to this invention includes a receiving means adapted in dimension and shape to be fitted within a conduit housing such as a conventional dipstick housing.

Hereinafter, the invention will be described in reference to its use in monitoring the oil level within a crankcase or oil reservoir of a conventional internal combustion engine. It should be understood that the invention may be utilized in any environment wherein a reservoir contains a fluid. Though the use and environment described, namely an internal combustion engine, is reflective of those other environments, it is in no sense restrictive of the myriad of environments wherein this invention may be used.

The receiving means extends within the conduit and into the oil reservoir a sufficient distance such that an access port positioned within the wall of the receiving means is positioned at a predetermined elevation within the oil reservoir; i.e., at or below the lowest level of oil in the reservoir which is desired to be monitored.

The receiving means includes an inner chamber communicating with the access port. The inner chamber is vented to the atmosphere, thereby allowing a free flow of oil from the oil reservoir, through the access port, into the inner chamber. Typically, the monitor is constructed such that the level of oil resident in the inner chamber has an elevation substantially equivalent to the level of oil in the supply reservoir; i.e., the static liquid head of the oil in the inner chamber and the static liquid head of the oil in the oil supply reservoir are equivalent at the access port.

The receiving means is fitted with a confinement means which is manually operable to seal the access port and essentially isolate the oil contained within the inner chamber. The confinement means is constructed so as to retain essentially the same oil content within the inner chamber as extant therein prior to the activation of the confinement means.

The level of the oil retained within the inner chamber, which level is reflective of the oil level in the reservoir, is determined by means of a piston assembly in association with an indication means. The piston assembly includes a piston head positioned within the inner chamber and made reciprocable therein. The piston head is adapted to form a liquid-impermeable seal against the walls of the inner chamber. The piston head reciprocates between two conditions. The first condition exists when the piston head is brought into pressurizing contact with the oil in the chamber. The oil, being essentially incompressible, tends to preclude any further piston head displacement in the direction of the oil. The second condition is directioned oppositely from the first condition and functions to depressurize the oil. The piston head is connected to an indication means by an essentially inelastic shaft member. The shaft member retains the piston head and indication means in a fixed, spaced relationship, said spaced relationship being determined along the shaft member since, in some embodiments, the shaft member may be flexible.

The indication means is adapted to be displaced by the action of the piston head in an amount indicative of the level of oil retained within the inner chamber. The indication means is fitted with markings, the displacement of which conveys to the user the quantity of oil in the supply reservoir.

BRIEF DESCRIPTION OF THE DRAWINGS

FIG. 11 is a side view of a flexible liquid level indicator in accordance with the details of this invention;

FIG. 12 is a cut-away side view of the level indicator shown in FIG. 11;

FIG. 19 is a side sectional view of another version of the indicator of this invention;

FIG. 20 is a cross-sectional view of the indicator of FIG. 19 taken along sectional line 20;

FIG. 21 is a side sectional view of an indicator constructed according to the details of this invention; and FIG. 22 is a cross-sectional view of the indicator of FIG. 21 taken along sectional line 22.

DESCRIPTION OF THE ILLUSTRATED EMBODIMENTS

Figure 1:
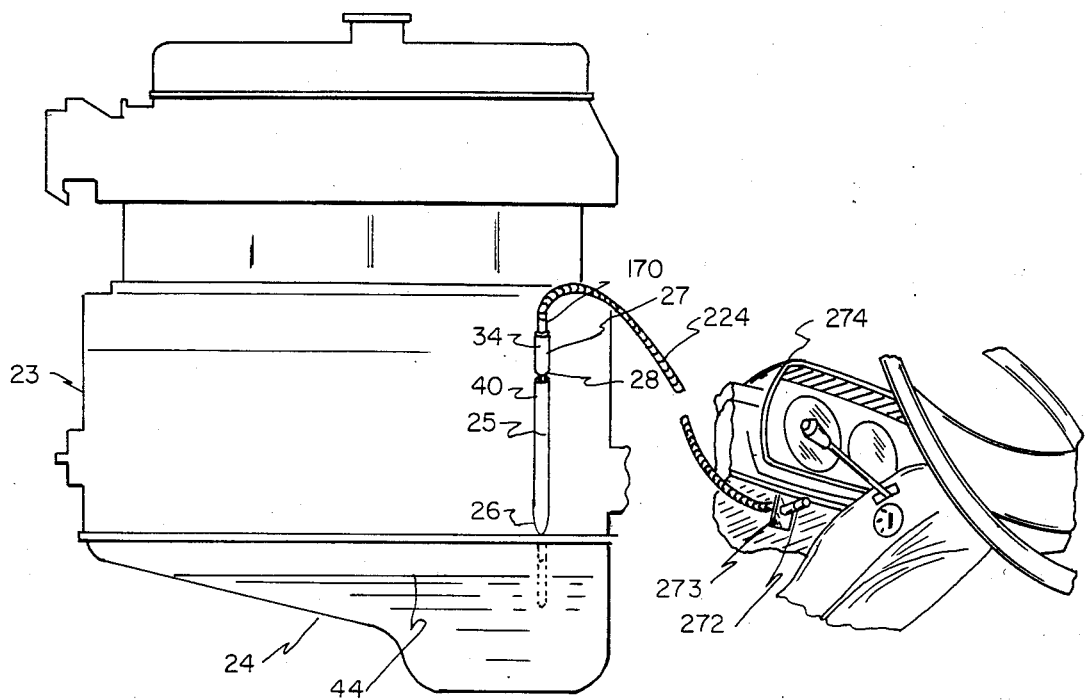
FIG. 1 is a perspective elevational view of an internal combustion engine having a crankcase in association with a vehicle dashboard. The engine is fitted with a conduit accessing the crankcase, wherein the conduit partly houses a liquid level indicator according to this invention. Indication means for the indicator are shown positioned on the dashboard.
Figure 4:
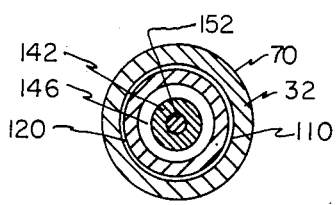
FIG. 4 is a cross-sectional top view taken along sectional line 4 of FIG. 2.
Figure 5:
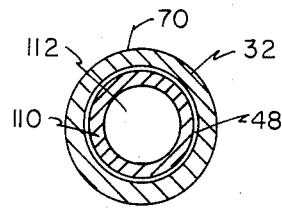
FIG. 5 is a cross-sectional view taken along sectional line 5 of FIG. 2.
Figure 6:
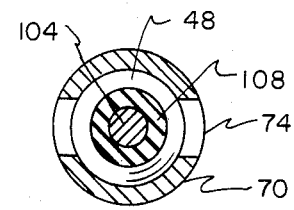
FIG. 6 is a cross-sectional view taken along sectional line 6 of FIG. 2.
Figure 7:
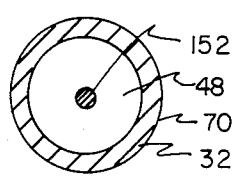
FIG. 7 is a cross-sectional view taken along sectional line 7 of FIG. 2.
Figure 8:
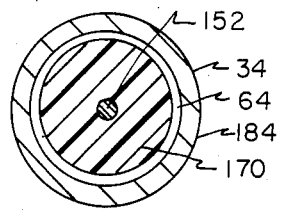
FIG. 8 is a cross-sectional view taken along sectional line 8 of FIG. 2.
Figure 9:
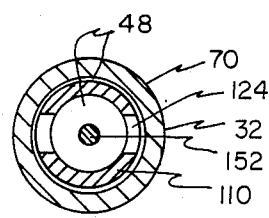
FIG. 9 is a cross-sectional view taken along sectional line 9 of FIG. 3.

As shown in FIG. 1, a conventional internal combustion engine 23; e.g., an automobile engine, includes an oil pan 24 which serves as a supply reservoir for oil which circulates through the engine during normal operation. Oil pan 24 is fitted with a hollow conduit 25 which typically extends from an access opening 26 into the oil pan. Conduit 25 further extends along the side of the engine 23, eventually terminating in an open end 28 located proximate the upper region of the engine 23.

Figure 2:
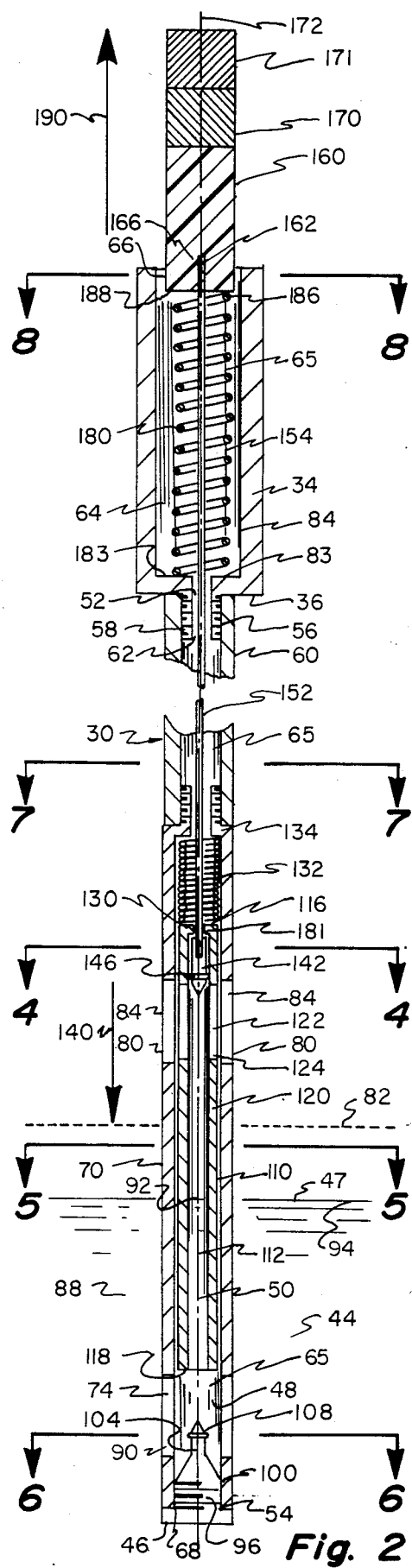
FIG. 2 is a cross-sectional side view of a liquid level indicator of this invention showing an inner chamber communicating with a pair of access ports.
Figure 3:
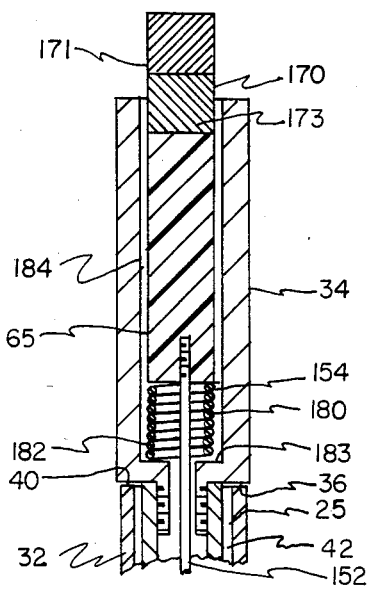
FIG. 3 is a cross-sectional side view of a liquid level indicator showing an inner chamber isolated from communication with a pair of access ports.
Figure 10:
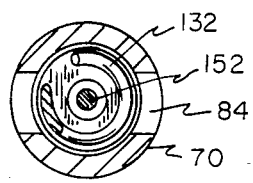
FIG. 10 is a cross-sectional view taken along sectional line 10 of FIG. 3.
Figure 13:
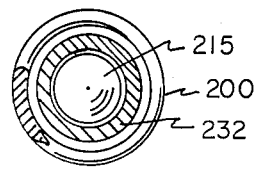
FIG. 13 is a cross-sectional view of FIG. 11 taken along sectional line 13.
Figure 14:
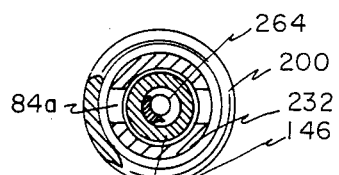
FIG. 14 is a cross-sectional view of FIG. 11 taken along sectional line 14.
Figure 15:
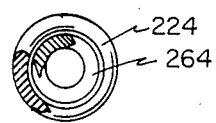
FIG. 15 is a cross-sectional view of FIG. 11 taken along sectional line 15.

A liquid level indicator, generally 27, constructed in accordance with this invention includes a receiving means, generally 30, a portion of which is dimensioned to be slidably received within conduit 25. As shown in FIG. 2, receiving means 30 may include a hollow tubular housing 32 having an outer diameter which is smaller than the inner diameter of conduit 25. Receiving means 30 also includes a tubular section 34 fixedly mounted on housing 32 having a diameter which may be larger than the inner diameter of conduit 25.

Section 34 includes a flange-like lip 36 which precludes the entrance of section 34 into the conduit 25. The smaller-diametered section 32 is of a sufficient length that, when receiving means 30 is inserted into conduit 25 such that flange lip 36 contacts the upper end 40 of conduit 25, section 32 extends through the interior channel 42 of conduit 25 and into reservoir 44 a sufficient distance that end 46 of section 32 is positioned below the lowest level 47 of liquid desired to be monitored. Section 32, as shown, is a generally tubular member having an essentially circular cross-section. Other constructions are within contemplation having different cross-sectional configurations.

Section 32 defines an interior channel or chamber 48 which extends along substantially the total length of the housing 32. As shown, this channel 48 may be substantially cylindrical in shape, having a longitudinal axis 50. Housing 32 includes a first open end 52 and a second open end 54. As shown, section 34 is mounted on housing 32 by means of a threaded connection 56. Threaded connection 56 may include a male threaded section 58 securely mounted on section 34 made mechanically cooperative with a female threaded socket 60 positioned within the interior channel 48. Male threaded section 58 defines a channel 62 which extends along the full length of section 58 and communicates with an open-ended channel 64 positioned within the interior of section 34. In essence, receiving means 30 defines a hollow elongate member, defining a channel, generally 65, which extends continuously between oppositely disposed open ends 66 and 68.

The wall 70 of section 32 is perforated at a location 72 proximate open end 68 with an access port 74 which communicates with interior channel 48. As shown, wall 70 may define a plurality of access ports 74. Access port 74 is positioned within wall 70 at a location which is level with or below the lowest oil level 47 for which the indicator is intended as a monitoring means.

Wall 70 is also perforated at a location 80, which location 80 is above any contemplated oil level 82. The perforation or perforations 84 at location 80 intercommunicate with interior channel 48, thereby forming a vent, whereby air within the channel 48 may be directed through vents 84 to the environment. The conjunction of access ports 74, wall 70 and vents 84 constitutes a construction which freely admits oil 88 from reservoir 44 into the interior channel 48 and permits that oil so admitted to rise within channel 48 such that the static liquid head of the column of oil within the channel 48 at a point 90 is substantially equivalent to the static liquid head of the oil in the reservoir 44 at that same point; i.e., the level 92 of oil within the channel 48 is of approximately the same elevation as the level 94 of oil in the reservoir 44.

The open end 68 of section 32 is fitted with a sealing plug 96. Plug 96 is mounted within open end 68 to form a liquid-tight seal. As shown, this mounting may include a female threaded socket 100 positioned within the interior channel 48 of section 32. Plug 96 is fitted with threads adapted to cooperate with the threads of socket 100 to form a liquid-impermeable union. Plug 96 is fitted with a secondary plug member 104 which extends vertically, essentially parallel to the longitudinal axis 50 of the receiving means. Plug member 104 includes a sealing means 108. As shown, that means may be a conventional "O" ring. The function of sealing means 108 will be discussed later.

Within channel 48 is a confinement means 109 which may be a substantially tubular housing 110. Housing 110 is dimensioned to be slidably retained within channel 48. Housing 110 defines an interior channel 112 which extends the full length of the housing 110 and communicates with open ends 116 and 118 of the housing 110. Wall 120 of housing 110 is perforated at location 122 defining at least one secondary venting aperture 124 which communicates the channel 112 with channel 48. Venting apertures 124 are positioned within wall 120 sufficiently proximate venting aperture 84 in wall 70 such that air contained within channel 112 may flow through aperture 124 and thereafter aperture 84, whereupon that air may flow from the indicator to the environment.

Open end 118 of channel 112 is dimensioned to receive and form a liquid-impermeable sealing union with the secondary sealing plug 104 upon housing 110 being lowered into abutment with plug 96. Open end 116 is fitted with a platform 130 of sufficient dimension to receive the force application of a spring member 132. Further, housing 32 is fitted with a corresponding flange platform 134 positioned on the interior of wall 70 and extending into channel 48. Spring member 132, which may be a coil spring, is positioned between flange platform 134 and platform 130, in essence driving tubular housing 110 in a direction indicated generally by directioned force vector 140. The effect of the spring-generated force is counterbalanced by an upwardly biased piston head 142. Head 142 is dimensioned to be reciprocable within channel 112. Head 142 is fitted with a sealing means 146 adapted to form a liquid seal against the wall 120 of housing 110; i.e., sealing means 146, upon displacement below venting apertures 124, effects a liquid-impermeable seal of channel 112 above open end 118. As shown, the sealing means may be a conventional "O" ring.

Piston head 142 is securely mounted to a substantially rigid shaft member 152. Shaft 152 extends upward through channels 48 and 62 and into channel 65 which is an open-ended channel within section 34 of receiving means 30. Shaft 152 is securely mounted to an indication means 160. As shown, shaft 152 may be fitted with a male threaded member 162 adapted for mechanical cooperation with a female threaded socket 166 housed within indication means 160. Indication means 160 includes a cylindrical member 170 adapted to reciprocate freely within channel 154.

As shown, cylindrical member 170 includes a plurality of circumferentially etched markings 171. Each marking lies within a plane which is perpendicular to the longitudinal axis 172 of cylindrical member 170.

In a preferred embodiment, indication means 160 is fitted with two corresponding bands 173 of contrasting colors. In operation, the amount of displacement of the bands with respect to the upper edge 174 of section 34 is easily determined by use of the colored bands.

A spring member 180 is positioned slidably with channel 154. The proximal end 182 of spring member 180 is positioned in abutment against a shelf-like extension 183 which is secured to wall 184 of section 34. The distal end 186 of spring member 180 abuts against surface 188 of cylindrical member 170. The compressive action of spring member 180 operates to direct cylindrical member 170 outward in the direction indicated by arrow 190.

The action of spring member 180 is counterbalanced by the action of spring member 132 in that the upward displacement of member 170 displaces shaft 152 and results in piston head 142 being moved upward compressing spring 132. Spring 132, in opposition, forces piston head 142 in the direction indicated by arrow 140 and therefore functions to compress spring 180.

An upward displacement of piston head 142 eventually causes that piston head to abut against flange 181. A further upward displacement of the piston head 142 operates to compress spring 132 until a counterbalance is achieved.

As shown in FIG. 11, the invention also includes a receiving means 30 which is constructed of a flexible member adapted to accommodate dipstick conduits which are angulated; i.e., not configured in a straight line. This second embodiment typically utilizes a first coil spring 200 which structurally and functionally corresponds to section 32 of receiving means 30 described above. Coil spring 200 has a generally open structure defining a plurality of apertures 202 which communicate with an interior channel 204. Open end 205 of coil spring 200 is securely fitted with a sealant plug 208. Plug 208 is similar to plug 96 in that it includes a male auxiliary plug 209 dimensioned to be received within a channel 215 of a confinement means 218, to be described later. Auxiliary plug 209 may include a sealing means 210 which may be a conventional "O" ring.

Coil spring 200 is fitted at its distal end 220 with a connection ring 222. Ring 222 is adapted to form a detachable connection with spring 200 and a second coil spring 224.

A confinement means, generally 218, is slidably fitted within interior channel 204 of coil spring 200. Confinement means 218 may include a flexible tubular member 232 having a wall 234. Wall 234 includes at least one aperture 236 therein, positioned so as to be above any contemplated oil level, upon coil spring 200 being inserted within conduit 25. Confinement means 218 has a flange 238 positioned on its proximal end 240 having an abutment surface 242 upon which is mounted a coil spring 231. Ring 222, having a portion 244 thereof positioned within interior channel 204, presents an abutment surface 246 upon which is mounted the opposing end of coil spring 231. An upward displacement of confinement means 218 is restricted in that any upward displacement functions to compress spring 231 and thereby establish an opposing force.

Ring 222 is fitted on its interior with a hollow channel 250, which channel 250 includes a female threaded socket 254 adapted to form a detachable union with coil spring 224.

Coil spring 224 defines an interior channel 260, which channel 260 slidably receives a flexible shaft member 262. Shaft member 262, as shown, may be a coil spring 264 or may be a flexible wire; e.g., piano wire. Shaft member 262 is fitted on its proximal end 266 with a piston head 268 which is similar in configuration and function to piston head 142 described above. On its distal end 270, shaft member 262 is securely mounted to an indication means 272 in a manner corresponding to that described above for indication means 160.

The distal end 279 of coil spring 224 is securely fitted within a flanged housing 280, which housing corresponds structurally and functionally with section 34 of receiving means 30 above.

Essentially, this second embodiment of the indicator parallels the construction of the first embodiment with the exception that receiving means 30, tubular housing 110 and shaft member 152 are fabricated from structures which are flexible and hence adapted to conform to the angled interior channel of a conduit 25 which is not linear in configuration. Further, this second embodiment permits the installation of indicator means 272 at a remote location, such as a dashboard. As shown in FIG. 1, spring 224 and spring 264 may be lengthened to permit the placement of indicator means 272 within a mounting 273 affixed to a vehicle dashboard 274.

Operationally, the indicator is constructed to permit monitoring of the level of fluid within the fluid reservoir without the indicator being removed from its conduit 25 housing. The indication means, in having a plurality of spaced circumferential markings therein, is readily observable as to the degree of displacement of that indication means into section 34 of receiving means 30. The degree of displacement reflects the level of oil within the reservoir. To operate the indicator, one depresses the indication means; i.e., displaces the indication means 160 into its housing, section 34 of receiving means 30. Shaft 152, being rigidly secured to the cylindrical member 170, is displaced downwardly an amount equal to the displacement of the cylindrical member 170.

Similarly, piston head 142, being connected to shaft 152, is also displaced downwardly an equal amount. As piston head 142 contacts the oil residing in tubular housing 110, the piston head 142, being fitted with liquid sealing means, initiates a compressive action on the oil. The oil is confined within the tubular housing 110 in that, upon piston head 142 being depressed beyond a position wherein it supports housing 110, spring 130 acts to push tubular housing 110 into a sealed abutment against male plug 104; i.e., plug 104 is inserted into the interior channel 112 and thereby seals the end 118, effectively precluding the escape of any oil residing within channel 112.

The oil, being substantially incompressible, produces a counterbalancing force on piston head 142, essentially precluding its further downward movement. The user is then able to deduce the level of the oil in the reservoir by resort to the markings on the cylindrical member 170 and the number of markings which remain visible from without housing 34; i.e., above edge 174. The depth to which cylindrical member 170 is inserted into housing 34 functions to obscure a varying number of the markings 171. The markings 171 are spaced on the cylindrical member 170 in a manner which reflects the positioning of the piston head 142 within channel 112 and, hence, the level of oil within the reservoir.

Figure 17:
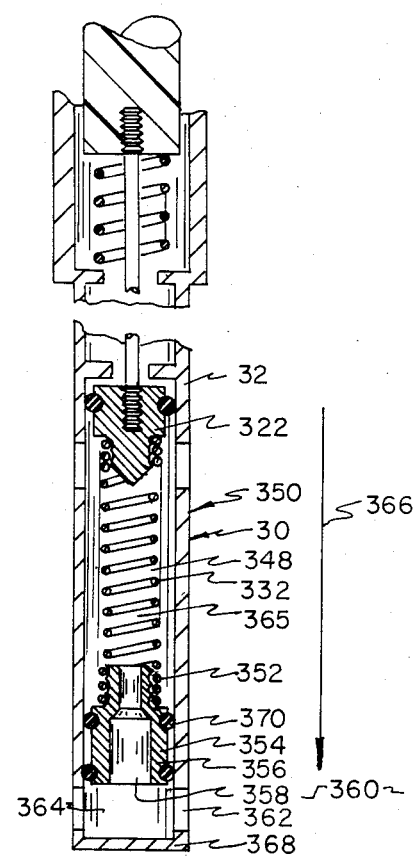
FIG. 17 is a side sectional view of an alternate version of the indicator of this invention.

Alternate embodiments of the indicator of this invention eliminate the need for a tubular housing 110 by modifying the structure of confinement means 108. As shown in FIG. 17, piston head 322 may be fitted with a spring member 332. Spring member 332 is dimensioned to be slidably reciprocable within channel 348 of a tubular housing 350. Securely mounted to proximal end 352 of spring 332 is a sealing means 354. As shown, sealing means 354 may be an essentially tubular member 356 dimensioned to reciprocate within channel 348. Tubular member 356 defines an open-ended interior channel 358 which extends over its full length, permitting oil to flow from the reservoir 360 through access ports 362 into the section 364 of channel 348 and thereafter through channel 358 into section 365 of channel 348. Tubular member 356 is dimensioned to be of sufficient height and diameter that, upon its being displaced downwardly in the direction indicated by arrow 336 and being brought into abutment against the sealed end 368, it forms a liquid-impermeable seal of access ports 362. As shown, tubular member 356 may be fitted with an auxiliary sealing means 370 which may be conventional "O" rings.

Spring 332 is constructed from a spring having a fairly low spring constant. Further, spring 332 is dimensioned such that its fully compressed state is only reached upon the piston head 322 being depressed within channel 348 below a position corresponding to the lowest oil level contemplated as being measurable by the indicator.

Figure 16:
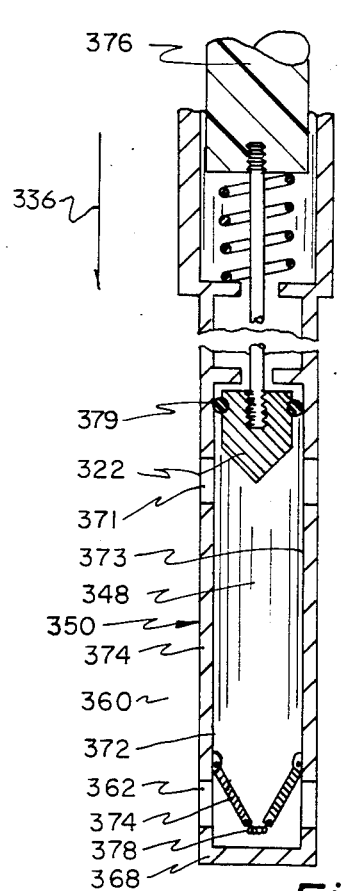
FIG. 16 is a side sectional view of another version of the indicator of this invention having a displaceable access port plug which is actuated by fluid flow.
Figure 18:
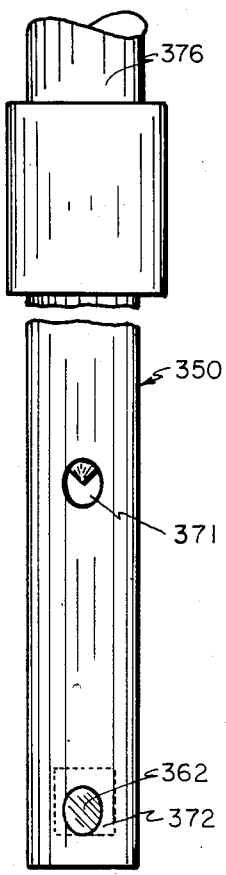
FIG. 18 is a side view of the indicator of FIG. 16.

FIG. 16 illustrates an alternate version of the indicator depicted in FIG. 17. As shown, a pair of hinged doors 372 are pivotedly mounted on the interior walls 374 of tubular housing 350, proximate the access ports 362. The doors 372 are linked at their proximal ends 374 by a resilient, elastic member 378 which may be a coil spring. Each of the doors are dimensioned to cover the corresponding access port 362 positioned proximate thereto and form a liquid-impermeable seal over that access port.

In operation, the spring 378 serves to retain the doors 373 in an open position as shown in FIG. 17. This open position permits oil from the reservoir 360 to enter channel 348. In that the channel 348 is vented to the atmosphere through venting apertures 371, the oil rises within channel 348 to an elevation approximate that of the oil residing in the reservoir 360.

Upon being depressed, the indication means 372 and piston head 322 being a downward displacement toward sealed end 368 of the tubular housing 350. The displacement of the piston head functions to force the oil within channel 348 from the channel through access ports 362 in that piston head 322 forms a liquid-impermeable seal against interior walls 373 of housing 350. As shown, piston head 322 may include sealing means 379. The resulting fluid flow functions to force each of the doors 373 into a closed position over its corresponding access port 362.

Continued downward displacement of the piston head eventually meets with a countervailing normal force produced by the essentially incompressible fluid remaining within the channel 348. The amount of displacement of the indication means 376 is thereby indicative of the level of oil within the reservoir.

Two embodiments of the indicator of this invention utilize an open-ended tubular housing 400 fitted at its proximal end 402 with an aperture-defining sealing plug 404, as shown in FIGS. 19 and 21.

As shown in FIG. 19, plug 404 may include an aperture 406 positioned substantially centrally within the plug. Aperture 406 communicates with the interior channel 408 defined by tubular housing 400. A piston head 412, configured similarly to piston head 322 shown in FIG. 16, is fitted with coil spring 414 which extends slidably through channel 408. The proximal end 416 of spring 414 is mounted with a plug member 418 dimensioned to be received within aperture 406 and form a liquid-impermeable seal with that aperture. As shown, plug 418 may include a sealing means 419 such as a conventional "O" ring.

In operation, indication means 420, which is connnected to piston head 412 by means of a longitudinally rigid shaft 422, is depressed. Piston head 412, being displaced downward in the direction indicated by arrow 424, positions plug 418 within aperture 406, thereby sealing the open end 402 of channel 408. Continued downward displacement of piston head 412 brings that head into contact with the level 426 of oil extant within the channel 408. The oil, being incompressible, exerts a reaction force on the piston head and thereby establishes an essentially equilibrium position of the piston head. That position is reflected in the amount of depression in the indication means 420. The etched markings on the indication means are then read so as to determine the level of oil within the oil reservoir. Spring 414 is dimensioned such that it reaches its fully compressed state only when the piston head is depressed below an elevation corresponding to the minimum oil level contemplated as being monitorable by the indicator.

FIG. 21 illustrates a second embodiment wherein a plug 430, sealing the open end 432 of a tubular member 434, defines an access port or ports 436. In this embodiment, the plug 430 defines a mounting platform, generally 438, adapted to secure an essentially vertically mounted shaft member 440. Further, plug 430 extends into the channel 442 defined by the hollow interior of tubular member 434 a predetermined distance. Plug 430 defines a recess well 444 which communicates with access ports 436 and further communicates with channel 442. Recess well 444 is dimensioned to slidably receive a secondary sealing plug 446 and form a liquid-impermeable seal with that plug sufficient to preclude the exit of oil within channel 442 through access ports 436. As shown, plug 446 may include a sealing means 448 which may be a conventional "O" ring.

Plug 446 is mounted slidably reciprocable on shaft member 440. A centrally positioned, upright channel 450 extends through plug 430 and is dimensioned to receive plug 446. An expanded section 452 of shaft member 440 having a diameter greater than the diameter of channel 450 serves to restrict upward displacement of the plug 446 beyond the elevation of section 452. The plug 446 is held in the position shown in FIG. 21; i.e., outside recess well 444, by the action of a spring 454 having a small spring constant.

Upon the downward displacement of a piston head 454, oil 456 extant within the channel 442 is forcefully directed downward through access ports 436. The flow of the fluid, together with the pressure differentials within channel 442 and recess well 444 operates to overcome the resistance of spring 454 and thereby forces plug 446 into a sealing relationship with recess well 444. Thereafter, the oil, being essentially confined within the channel 442, is measured in a manner corresponding generally to the methods described above for the alternate embodiments.

The liquid level monitoring device of this invention is particularly useful in measuring or determining a liquid level in an inaccessible reservoir. The device, as indicated herein, is especially useful in measuring the oil level in an automobile engine. It is equally useful for automobile transmissions since a very long dipstick is usually associated with such transmissions and since it is difficult for a motorist to reach the proximal end of the transmission dipstick without leaning well into the engine compartment, thereby leaning against the automobile and risking soiled clothing. Also, the transmission dipstick is frequently dirty because of its location. Thus, the device described herein is particularly effective as a replacement for an automatic transmission dipstick.

A short measuring device of the type described herein can also be readily used with automobile power steering units to measure the level of power steering fluid.

As can be appreciated from the description and illustrations provided herein, the device of the instant invention is particularly effective as a substitute for dipstick measuring devices. For example, dipsticks are frequently used to measure liquid levels in underground tanks. A lengthy liquid level monitoring device of the type described herein would readily work, and could have advantages, as a measuring device for underground tanks. For example, such a device permanently installed would permit frequent measurements without opening the tank, releasing vapors or risking introduction of dirt or other contaminants.

It is to be understood that the embodiments herein described are merely illustrative of the principals of the invention. Reference herein to the details of the illustrated embodiments is not intended to limit the scope of the claims, which themselves recite those features regarded as essential to the invention.

I claim:

1. An apparatus for monitoring the level of a liquid body in a reservoir, said apparatus comprising:
  a hollow vented receiving means mountable onto structure located in a fixed relation to said reservoir, said receiving means being adapted to extend into said reservoir such that an upper region of said receiving means is proximate the level of said liquid body, said receiving means having a lower access port in a lower regions of said receiving means adapted to permit said liquid to flow into said receiving means and an upper venting port to allow equalization of pressure within said receiving means;

a confinement means made mechanically cooperative with said receiving means, said confinement means being manually reciprocable between two positions, a first position wherein said confinement means seals said access port and thereby confines any liquid extant within said receiving means within said confinement means, a second position remote from said access port to permit the passage of said liquid from said receptacle into said receiving means and to expose said upper venting port;

liquid displacement means mechanically interconnected with said confinement means and adapted to be manually reciprocated between a first and second condition within said confinement means, said first condition effecting a pressurization of any liquid contained in said confinement means when said confinement means is in said first position, said second condition effecting a depressurization of said liquid and forcing said confinement means into said second position, said liquid displacement means having seal means to seal against fluid passage; and an indication means attached to said liquid displacement means to indicate the position of said liquid displacement means within said confinement means, the positioning of said liquid displacement means being indicative of the level of said liquid within said confinement means and therefore the level of the liquid body in said reservoir.

2. The apparatus of claim 1 wherein said receiving means comprises a first hollow, elongated tube having an essentially cylindrical channel therein, said tube having a vent aperture in a wall thereof intercommunicating with said channel.

3. The apparatus of claim 2 wherein said tube has a closed end fitted with a sealing means adapted to cooperate with said confinement means to form a liquid seal.

4. The apparatus of claim 1 wherein said confinement means comprises a second, open-ended tubular member dimensioned to slide within said cylindrical channel within said receiving means, said second tubular member possessing a second cylindrical channel therein.

5. The apparatus of claim 1 wherein said liquid displacement means is a piston dimensioned to form a liquid-tight seal against the inner walls of said confinement means.

6. The apparatus of claim 5 wherein said piston means is connected to said indication means by a substantially rigid shaft to hold said piston means and said indication means in a fixed spatial relationship.

7. An apparatus for monitoring the level of a liquid body in a reservoir, said apparatus comprising:

a first elongated tube, possessing a first interior channel, having a closed end, said first tube being mountable to structure located in a fixed relation to said reservoir, such that said closed end is below the level of a liquid body in said reservoir, said first tube defining at least one access port which communicates with the interior channel of said first tube, said closed end of said first tube being fitted with a seat, said first tube defining at least one vent aperture therein communicating with said first interior channel;

a second elongated tube positioned manually reciprocable within said first channel of said first tube, said second tube being open at each end, one end of said second tube cooperating with said seat upon being brought into abutment therewith to form a liquid seal, said second tube defining a second cylindrical channel therein, said second channel communicating with said first vent aperture through a second vent aperture defined by said second tube, said second tube being reciprocable between two positions, a first position wherein said second tube is positioned over said access port thereby confining any liquid extant within said second tube, a second position wherein said second channel communicates with the liquid in said reservoir;

a piston comprising:
a piston head positioned manually cooperable within said second channel, said piston head being dimensioned to form a liquid seal against the walls of said second channel, and
a piston shaft mounted on said piston head extending through said first channel;

a depressible indication means mounted on said piston shaft to hold said indication means in a fixed relationship with said piston head wherein the amount of depression of said indication means is indicative of the level of said liquid body within said reservoir;

first spring member mounted within said first channel having one end fixedly secured to said first tube, an opposing end being biased against said second tube thereby directing said second tube toward the first position; and a second spring member mounted within said first channel having one end fixedly secured to said first tube, an opposing end being biased against said indication means, whereby said piston is biased against an interior shelf member of an upper portion of said second tube thereby directing said second tube toward the second position;

wherein a depression of said indication means results in said first spring member directing said second tube into a sealing abutment against said seat thereby confining a quantity of fluid having an elevation substantially equivalent to the level of said liquid body in said reservoir, within said second tube, a further depression of said indication means directing said piston head into a pressurizing abutment with said second tube confined quantity of liquid, the amount of depression of said indication means being reflective of the level of the liquid body in said reservoir.

8. The apparatus of claim 7 wherein said first tube is a flexible spring.

9. The apparatus of claim 8 wherein said second tube is a flexible plastic tube.

10. The apparatus of claim 9 wherein said shaft is a flexible wire.

11. The apparatus of claim 1 wherein said first tube is a flexible spring.

12. The apparatus of claim 11 wherein said second tube is a flexible plastic tube.

13. The apparatus of claim 12 wherein said shaft is a flexible wire.

14. An apparatus for monitoring the level of a liquid body in a reservoir, said apparatus comprising:

a hollow vented receiving means mountable onto structure located in a fixed relation to said reservoir, said receiving means being adapted to extend into said reservoir such that an upper region of said receiving means is proximate the level of said liquid body, said receiving means having a lower access port in a lower region of said receiving means adapted to permit liquid to flow into said receiving means and an upper venting port to allow equalization of pressure within said receiving means;

a confinement means made mechanically cooperative with said receiving means, said confinement means being manually reciprocable between two positions, a first position wherein said confinement means seals said access port and thereby confines any liquid extant within said receiving means within said confinement means, a second position remote from said access port to permit the passage of said liquid from said receptacle into said receiving means and to expose said upper venting port;

liquid displacement means mechanically interconnected with said confinement means and adapted to be manually reciprocated between a first and second condition within said receiving means, said first condition effecting a pressurization of any liquid contained in said confinement means when said confinement means is in said first position, said second condition effecting a depressurization of said liquid and forcing said confinement means into said second position, said liquid displacement means having seal means to seal against fluid passage; and an indication means attached to said liquid displacement means to indicate the position of said liquid displacement means within said receiving means, the positioning of said liquid displacement means being indicative of the level of said liquid within said confinement means and therefor the level of the liquid body in said reservoir;

a first spring, mechanically connected with said confinement means, said first spring biasing said confinement means into its second position;

a second spring, mechanically connected with said confinement means, said second spring biasing said confinement means toward its first position;

wherein said first spring dominates said second spring, resulting in said confinement means being held in its second position absent an application of an exterior force to said confinement means urging said confinement means toward its first position.

* * * * *